Aug. 9, 1966  T. TEILING  3,265,866
CORRECTOR FOR GUN FIRE CONTROL OF FIELD ARTILLERY PIECES
Filed Dec. 13, 1962
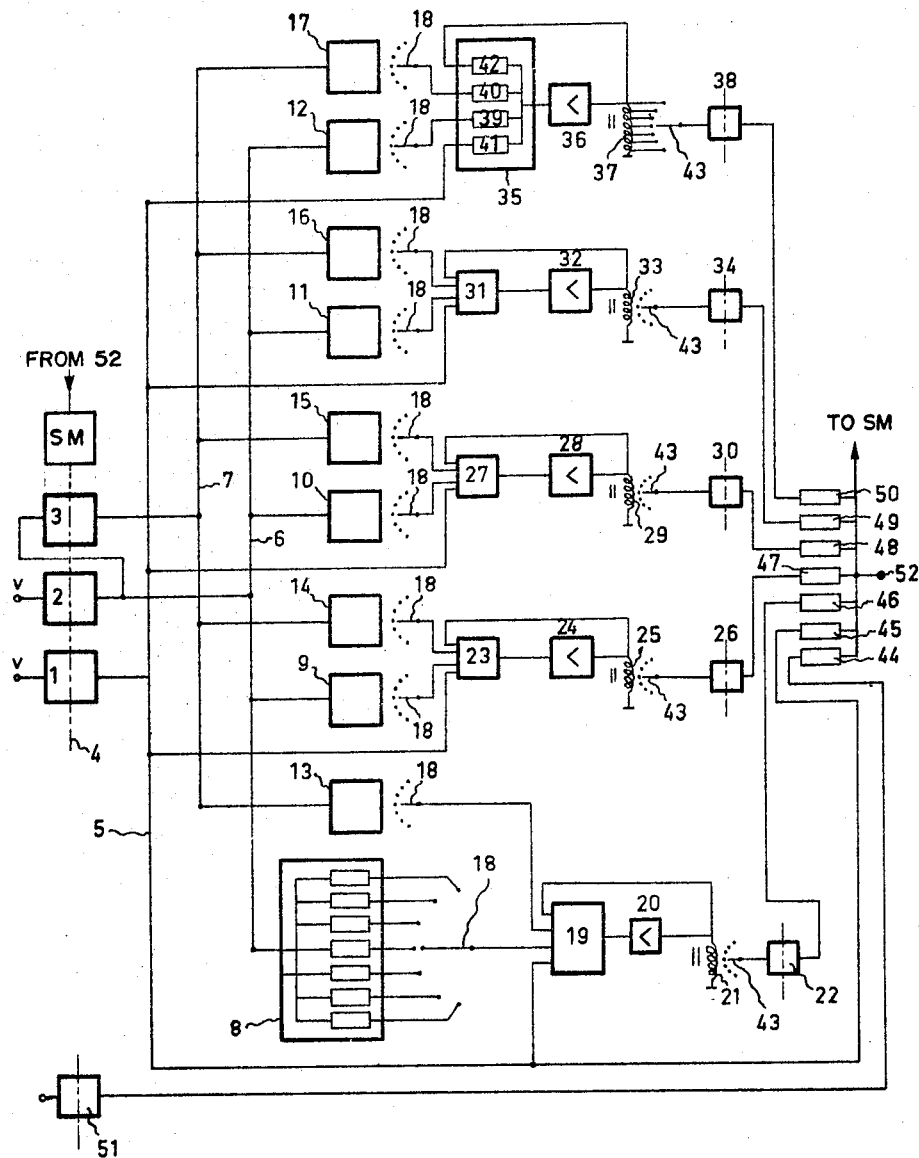
Torbern Teiling, Inventor
By Wenderoth, Lind and Ponack, Attorneys

United States Patent Office 3,265,866
Patented August 9, 1966

3,265,866
CORRECTOR FOR GUN FIRE CONTROL OF FIELD ARTILLERY PIECES
Torbern Teiling, Lidingo, Sweden, assignor to Arenco Electronics Aktiebolag, Vallingby, Sweden
Filed Dec. 13, 1962, Ser. No. 244,418
Claims priority, application Sweden, Dec. 18, 1961, 12,604/61
4 Claims. (Cl. 235—61.5)

The present invention relates to correctors for field artillery pieces and is of the kind incorporating means for setting measured values to a desired target point and means for setting ballistic disturbances due to changes from the normal values of for instance the muzzle velocity, air density, temperature and windage and computing means for converting the coordinates of the true target point $X_0$ in the desired trajectory of the projectile through this point to the coordinates of a corresponding point $X$ in a tabled trajectory for which the disturbances are equal to zero and which is utilized for adding actual fire control data such as quadrant elevation and fuse setting to an artillery piece in order that the projectile under the influence of prevailing ballistic deviations in the disturbed trajectory will hit the desired target point.

Such a corrector is extensively described in the Swedish patent specification 164,469. For generating electrical magnitudes corresponding to the influences of the ballistic disturbances at different shot distances a number of potentiometers are provided which are adjustable by means of cams. With the described corrector only two ballistic functions have been included although in practice up to ten in number are required for each one of the charges of the piece. The number of charges amounts of 6–8, and consequently the number of required cams will be 60–80 in number. A corrector of this kind is thus very complicated out of a mechanical point of view and also bulky.

The object of the present invention is to provide a corrector in which the above inconveniences are eliminated and which in addition to this may be shifted in a simple way for use with different kinds of artillery pieces.

According to the invention this has been rendered possible thereby that for generating magnitudes corresponding to the influences of the ballistic disturbances there is provided a means for generating electric signals, which are substantially proportional to $x$, $\sin x\pi$ and $\sin 2x\pi$, wherein $x$ is a function of the distance to the point of impact of the table trajectory or to the target, which signals are arranged to be supplied to a number of parallel branches corresponding to the number of ballistic disturbances, in which the signals via individual impedances are supplied to a summing means provided for each branch, the impedances of each branch being thus adapted that in the output circuits of the various summing means, which comprise means for adjusting the magnitude of the output signals in dependence of the deviations of the ballistic disturbances from the standard values, signals are obtained, which at variation of $x$ closely reproduce the influences of the respective disturbances as a function of $x$.

The arrangement for generating said electrical signals, which are substantially proportional to $x$, $\sin x\pi$ and $\sin 2x\pi$ in the most simple case may comprise a linear and two trigonometric potentiometers arranged with a common axis of rotation and the arrangement is utilized for ensuring that signals are generated simultaneously in the various branches, which signals by suitably adaped impedances have been brought closely to concide with the influences of the respective disturbances as a function of $x$ at a predetermined charging. A corresponding branch may furthermore be arranged for generating a signal corresponding to the influence of the difference in altitude between the target and artillery piece which influence is of a similar kind as the influence of a ballistic disturbance. In order to render possible the use of the corrector at different charges the impedances are suitably arranged with stepwise variable values by means of switches by means of which impedances with values corresponding to different charges may be switched in. All impedances are furthermore preferably arranged as an easily replaceable unit provided with contact means for ensuring the connection of other units provided with impedances which are adapted to various types of artillery pieces.

An essential advantage of the corrector according to the invention resides therein that in the said means for generating electric signals proportional to $x$, $\sin x\pi$ and $\sin 2x\pi$, the magnitude $x$ may be varied by the aid of a servo motor having a sufficiently low demand for power in order to come in question with a portable corrector.

The invention will more clearly be explained in the following description with reference to the attached drawing, in which an embodiment of the invention, chosen as an example, is diagrammatically shown.

The arrangement for generating electrical signals proportional to $x$, $\sin x\pi$, and $\sin 2x\pi$, herein comprises a linear and two trigonometric potentiometers 1, 2 and 3, respectively, which are actuated by a common shaft of rotation 4. The potentiometers 1 and 2 are supplied with a reference voltage $V$ and are arranged to supply voltages proportional to $x$ and $\sin x\pi$, respectively, wherein $x$ represents the angle of rotation of the shaft 4 and constitutes an expression for the ratio of the distance $x$ to the point of impact to the table trajectory and the distance $x_{max}$ to a maximally distant point of impact. The signal from the potentiometer 2 is supplied to the potentiometer 3 which is arranged to multiply this signal by $2 \cos x\pi$ obtaining a signal proportional to $2 \sin x\pi \cdot \cos x\pi$, i.e. $\sin 2x\pi$.

The signals from the potentiometers are supplied by way of leads 5, 6 and 7 respectively to different resistors, which are arranged in groups. The lead 6 is connected to the five groups 8–12, inclusive, of which each comprises seven resistors as shown in the group 8. The lead 7 is connected in a corresponding way to the five groups 13–17 inclusive, each of which likewise comprise seven resistors. In all groups 8–17, inclusive, switches 18 are arranged as shown in the group 8. These switches may be actuated by a common shaft (not shown) for connecting a resistor at a time in each group with summing means 19–22, 23–26, 27–30, 31–34 and 35–38. A resistor in each group 12 and 17 is then connected to each one resistor 39 and 40, respectively, in the group 35. A third resistor 41 of the group 35 is connected to the line 5. The resistors 39–41 are interconnected and connected on one hand to an amplifier 36 and on the other hand to a summing resistor 42 in order to obtain via a winding 37, in a manner known per se, a signal representing the sum of the signals supplied to the resistors 39–41. In a corresponding way signals are obtained over the windings 21, 25, 29 and 33, which represent the sum of the signals supplied to the resistor groups 19, 23, 27 and 31, respectively (shown in a simplified form). The windings 21, 25, 29, 33 and 37 are each provided with seven terminals, which may be connected one at a time to potentiometers 22, 26, 30, 34 and 38, respectively, with individual setting shafts by means of switches 43, which may be actuated by a common shaft (not shown) connected to the shaft of the switches 18.

The operation of the part of the corrector shown so far is as follows. The resistor groups 19, 23, 27, 31 and 35 of the summing means are supplied with signals proportional to $x$, sin $x\pi$, and sin $2x\pi$. The magnitude $x$ may be varied from the value zero to 1 by turning the shaft 4. By that a signal is obtained in each switch 43, which signal is a function of $x$ the appearance of which depends upon the connected resistances of the resistor groups 8, 13; 9, 14; 10, 15, 11, 16 and 12, 17, respectively. The seven positions of the switches 18 and 43 correspond to the charges 2-8 used in field artillery and the resistances of the resistors in the different groups 8-17 as well as the terminals of the windings 21, 25, 29, 33 and 37 are adapted in such a way that the signals obtained in the switches 43 as much as possible approach values which, at variation of $x$, coincide with the influence factors of desired ballistic and similar disturbances at the different charges. In order to obtain signals which reproduce the influences of the disturbances the signals are taken out from the summing means via potentiometers 22, 26, 30, 34 and 38 in relation to the deviations of the disturbances from their standard values. The setting shaft of the potentiometers 22 is thus set to a position corresponding to the windage along the firing plane and in a corresponding way the air density is set on the potentiometer 26, the air temperature is set on the potentiometer 30, the deviation from the average value of the muzzle velocity is set on the potentiometer 34 and the difference in altitude between the artillery piece and the target is set on the potentiometer 38.

As shown in the Swedish patent specification 164,469 one must solve an equation $$x + \sum \frac{\partial x}{\partial q}\left(x\right) \cdot \Delta q = x_0$$

wherein:

$x$ is the distance to the point of impact of the table trajectory, $\sum \frac{\partial x}{\partial q}\left(x\right) \cdot \Delta q$ is the sum of the influences of the disturbances, and $x_0$ is the distance to the target in order accurately to compute the position of the point of impact of the table trajectory.

To this end there is provided at the corrector according to the invention, a second summing means represented by the resistors 44-50. The magnitude $x$ is obtained from the lead 5 and is supplied to the resistor 45. The magnitudes corresponding to the influences of the ballistic disturbances and of the differences of altitude are obtained from the potentiometers 22, 26, 30, 34 and 38 and are supplied to the resistors 46-50. These magnitudes represent the left side of the above equation. The magnitude $x_0$ of the right hand side is obtained by means of a potentiometer 51 and is supplied to the resistor 44. The potentiometer is supplied in a common way with a suitable reference voltage and its setting shaft is set into a position corresponding to the distance to the target. The signals corresponding to said magnitudes are supplied to the respective resistors so that the signals to the resistors 45-50 are added and compared with the signal to the resistor 44. By means of, for instance, a zero setting instrument connected to the output lead 52 of this summing means the shaft 4 may be rotated to a position in which the signal on the lead 52 will be zero, whereafter the magnitude is read from a dial (not shown) at the shaft 4. The shaft 4 may also be arranged to be set by means of a servo motor SM guided by the signal on the lead 52. Also the potentiometers 22, 26, 30, 34, 38 and 51 are obviously provided with dials for the setting of the respective setting shafts.

Oviously the invention is not limited to the embodiment shown but a variety of modifications are possible within the scope of the invention. In a corrector of the present kind it has proved sufficient to arrange three potentiometers 1, 2, 3 in order to reproduce the influences of the disturbances and the demands for accuracy of the potentiometers are not particularly large. In certain cases it may also be convenient to design the potentiometers in such way that certain deviations from linear and trigonometric functions are obtained, viz if the influences of all disturbances present the same basic characteristics. Principally obviously also more potentiometers may be arranged for generating signals proportionate to sin $3x\pi$, sin $4x\pi$ and so on. It is furthermore obvious that the corrector may be provided with means for computing the azimuth angle according to the corresponding principle as that indicated herein.

I claim:

1. An electric correction computer for field artillery gun fire control, comprising a common signal generating means for generating electrical signals proportional to $x$, sin $x\pi$ and sin $2x\pi$, where $x$ is proportional to the distance to the point of impact in the trajectory calculated from ballistic tables (the point of aim), a number of circuit branches corresponding to the number of ballistic disturbances, as for instance the initial muzzle velocity, air density, temperature and windage, a first summing means in each branch, said summing means having a plurality of inputs, means connecting the inputs of each summing means with the outputs of said signal generating means via individual impedances for at least two of said signals, said impedances of each branch being thus adapted that in output circuits of the various summing means, which include means for setting the magnitude of the output signals depending upon the deviations of the ballistic disturbances from the standard values, signals are obtained which vary with $x$ and represent the influences of the respective disturbances on the projectile as a function of $x$.

2. An electric correction computer as claimed in claim 1, wherein each of said individual impedances comprises a plurality of resistors arranged to have step-wise graduated resistance values, said resistances being selectable by means of switches connecting in circuit appropriate resistors with resistance values corresponding to different propellant charges used in the gun.

3. An electric correction computer as claimed in claim 2, wherein the resistors are arranged as an easily replaceable unit provided with contact means for ensuring the connection of alternative units having resistance values which are adapted to different kinds of guns.

4. An electric correction computer as claimed in claim 1, wherein there is provided a second summing means in which the signals corresponding to the influences of the ballistic disturbances are added with a signal derived in a similar manner and corresponding to the influence of the difference in altitude between the target and the gun and with said signal proportional to the distance to the point of aim and in which summing means the sum of said signals are compared with a signal corresponding to the distance to the target in addition to which a servomotor is arranged for setting the signal generating means to a position in which the output signal from said second summing means will be zero.

References Cited by the Examiner
UNITED STATES PATENTS

| | | | |
|---|---|---|---|
| 2,754,058 | 7/1956 | Crowther | 235—61.5 |
| 2,782,988 | 2/1957 | Mikol | 235—61.5 |
| 2,823,585 | 2/1958 | Gary et al. | 235—61.5 X |
| 3,051,386 | 8/1962 | Fayard | 235—197 X |

MALCOLM A. MORRISON, *Primary Examiner.*

I. KESCHNER, *Assistant Examiner.*